United States Patent
Kawakami

[19]

[11] Patent Number: 6,052,256

[45] Date of Patent: Apr. 18, 2000

[54] RECORDING DEVICE FOR A REMOVABLE DISK CARTRIDGE WHEREIN A CHASSIS IS MOVABLE WITH RESPECT TO AN INNER HOLDER

[75] Inventor: Kouichi Kawakami, Nara, Japan

[73] Assignee: Sanyo Electric Co., Ltd., Moriguchi, Japan

[21] Appl. No.: 09/094,631

[22] Filed: Jun. 15, 1998

[30] Foreign Application Priority Data

Jun. 16, 1997 [JP] Japan ................................. 9-158291
Jun. 16, 1997 [JP] Japan ................................. 9-158470
Jun. 16, 1997 [JP] Japan ................................. 9-158488

[51] Int. Cl.[7] .................................................. G11B 17/04
[52] U.S. Cl. ..................... 360/99.06; 369/75.2; 369/77.2
[58] Field of Search ............................ 360/99.02, 99.03, 360/99.06, 99.07; 369/75.2, 77.2

[56] References Cited

U.S. PATENT DOCUMENTS 4,774,608  9/1988  Horiuchi et al. ..................... 360/99.07
5,805,555  9/1998  Jones et al. ............................ 369/77.2
5,883,871  3/1999  Shihou .................................. 369/77.2
5,917,795  6/1999  Furukawa et al. ..................... 369/77.2

FOREIGN PATENT DOCUMENTS

0482585 A2  4/1992  European Pat. Off. .
0501337 A2  9/1992  European Pat. Off. .

*Primary Examiner*—William R. Korzuch
*Attorney, Agent, or Firm*—Armstrong, Westerman, Hattori, McLeland & Naughton

[57] ABSTRACT

A disk recording device has inside a cabinet a mechanical deck comprising an inner holder for horizontally holding therein a cartridge containing a disk, a chassis movable toward and away from the inner holder and provided with a pickup for projecting a beam on the disk, and an outer holder provided over the inner holder and slidable along the direction of insertion of the cartridge. The inner holder is fixed to the cabinet through holes and cutouts formed in the chassis, and the chassis is movable upward and downward relative to the inner holder. A space for accommodating the pickup is formed between the lower surface of the chassis and the bottom surface of the cabinet when the chassis is in a completely lowered position.

2 Claims, 12 Drawing Sheets

RECORDING DEVICE FOR A REMOVABLE DISK CARTRIDGE WHEREIN A CHASSIS IS MOVABLE WITH RESPECT TO AN INNER HOLDER

FIELD OF THE INVENTION

The present invention relates to a device for recording data on a disk as accommodated in a cartridge.

BACKGROUND OF THE INVENTION

A recording medium is already in use which comprises a disk 60 accommodated in a rectangular cartridge 6 formed at a side portion thereof with a window 62 for exposing the disk as shown in FIGS. 20(a) and (b) (see JP-A No. 298799/1993). The window 62 is opened or alternatively closed with a shutter 61 which is slidable on the cartridge 6. The shutter 61 has a side wall formed with a small hole 63. The cartridge 64 has a first slit 64 formed in a side wall thereof where the shutter 61 is provided, and a second slit 65 in another side wall thereof opposite to the shutter 61. The shutter 61 is engaged with the cartridge 6 by a lock mechanism (not shown). When the cartridge 6 is inserted into a recording device, an unlocking piece 29 in the recording device advances into the first slit 64, unlocking the shutter 61 and pushing the shutter open.

FIG. 21 is a side elevation showing the relationship in position between a mechanical deck 100 for receiving the cartridge 6 as inserted and a cabinet 4 housing the deck 100. The cabinet 4 has a front opening which is provided with a pivotal panel 42 pivoted at its upper end to the cabinet 4. The cartridge 6 is inserted into the mechanical deck 100 while opening the pivotal panel 42.

FIG. 17 is an exploded perspective view of the mechanical deck 100. In the following description, the side of the deck 100 at which the cartridge 6 is delivered from the deck 100 will be referred to as the "delivery side," the direction in which the cartridge advances as "forward," and the direction in which the cartridge is delivered as "rearward." The mechanical deck 100 comprises the combination of an inner holder 2 into which the cartridge 6 is inserted from the front opening, and an outer holder 3 covering the upper side of the inner holder 1. The combination is mounted on a chassis 1, which is secured to the bottom wall of the cabinet 4.

A pickup 75 and turntable 76 are provided on the chassis 1 as well known. A head lever 7 biased downward and carrying a recording head 70 at its distal end is attached by a bracket 71 to the pickup 75. The head lever 7 is moved upward and downward by a head lift mechanism (not shown) mounted on the chassis 1.

A kickout lever 8 having a cutout 86 formed in a peripheral edge portion thereof is pivotally supported on the upper side of the inner holder 2. Disposed forwardly of the kickout lever 8 is a stopper piece 17 provided upright on the chassis 1. The kickout lever 8 is biased by a tension spring 85 toward the cartridge delivery side into contact with a stopper 210 on the upper side of the inner holder 2.

The kickout lever 8 has one end bent downward to provide a push lug 80 pushable by the cartridge 6. The outer holder 3 is provided over the inner holder 2. Pins 220, 220 projecting from each of opposite side walls of the inner holder 2 are fitted in cam slots 30 formed obliquely in a side wall of the outer holder 3. Projections 37 project outward from each of opposite side walls of the outer holder 3. One of these side walls has a grip 31 projecting outward and to be pulled by the user when the cartridge 6 is to be delivered.

Each of opposite side walls of the chassis 1 has guide grooves 18 for the respective projecting pins 220 to fit in and horizontal slots 19 for the respective projections 37 to fit in. Each guide groove 18 has a horizontal portion 18a and a vertical portion 18b continuous therewith. A spring retainer 38 projects from the rear end of one side wall of the outer holder 3.

FIGS. 19(a) and (b) are side elevations of the mechanical deck 100. A tension spring 9 extends from the spring retainer 38 to the chassis 1, biasing the outer holder 3 toward the direction of insertion of the cartridge 6.

FIGS. 18(a) and (b) are plan views of the mechanical deck 100. When the cartridge 6 is inserted into the inner holder 2 in a standby state shown in FIG. 18(a), the cartridge 6 pushes the push lug 80 against the tension spring 85, rotating the kickout lever 8 counterclockwise, whereby the cutout 86 of the lever 8 is opposed to the stopper piece 17, allowing the inner holder 2 to advance a distance corresponding to the depth of the cutout 86.

The inner holder 2 is provided inside thereof with a projecting piece (not shown) fittable in the second slit 65 of the cartridge 6. When the rear end of the second slitted portion 65 pushes the projecting piece on the inner holder 2, each projecting pin 220 on the inner holder 2 in the state shown in FIG. 19(a) slidingly moves along the horizontal portion 18a of the guide groove 18 to push the cam slotted portion 30 of the outer holder 3. The outer holder 3 pushed by the inner holder 2 has its projections 37 fitted into the respective horizontal slots 19 of the chassis 1 and slidingly moves horizontally.

Upon each projecting pin 220 reaching the front end of the horizontal portion 18a, the inner holder 2 descends, and the pin 220 reaches the lower end of the vertical portion 18b as seen in FIG. 19(b). The cartridge 6 descends while holding the kickout lever 8 in its pushed position. The inner holder 2 lies on the chassis 1 with the cartridge 6 placed therein. The outer holder 3 biased forward by the tension spring 9 biases the inner holder 2 forwardly downward through the projecting pins 220, biasing the cartridge 6 toward the turntable 76.

However, the conventional device has the following problems.

1. The chassis 1 is fixed to the cabinet 4, and the inner holder 2 is movable upward and downward above the chassis 1. Since none of parts such as pickup 75 can be provided in the space for the inner holder 2 to pass through for upward and downward movement, a dead space corresponding to the amount of up-down movement of the inner holder 2 is formed inside the cabinet 4. The space presents an obstacle to a reduction in the thickness of the device.

2. The cartridge 6 is horizontally inserted into the cabinet 4 and then descends. If the distance of descent is small, therefore, the pivotal panel 42 is pushed open once by the cartridge 6 moving horizontally as shown in FIG. 22(a) and is likely to be thereafter held semiopen by the cartridge 6 as loaded in position as shown in FIG. 22(b). The semiopen panel 42 has a poor appearance, making the user feel as if the cartridge 6 were caught by an obstacle in the course of descent.

To eliminate this semiopen state, it is necessary to prevent the contact of the lower end of the pivotal panel 42 with the upper surface of the cartridge 6 by increasing the distance of descent of the cartridge 6 or lengthening the distance between the panel 42 and the mechanical deck 100. In either case, the device then becomes greater in size. Further there is a need to provide a mechanism for opening the panel 42 when the cartridge 6 is to be delivered. This requires a complex mechanism.

SUMMARY OF THE INVENTION

An object of the present invention is to provide a compacted recording device of reduced thickness for use with a cartridge as loaded therein.

An inner holder 2 is attached to a cabinet 4, and a chassis 1 positioned between the inner holder 2 and the cabinet 4 is movable upward and downward relative to the inner holder 2.

In this case, a space 44 for accommodating a pickup 75, etc. needs to be provided on the rear side of the chassis 1 (see FIG. 15). The chassis 1 moves upward and downward in this space 44. Thus, the space 44 for accommodating the pickup, etc. and the space for the upward and downward movement of the chassis 1 can be both provided under the chassis 1 to effectively utilize the interior space of the device. This reduces the thickness of the device.

The inner holder 2 to be loaded with the cartridge 6 does not move upward or downward. A pivotal panel 42 is held completely opened by contact with the upper surface of the cartridge 6 as loaded in the inner holder 2. Unlike the prior art, therefore, the invention eliminates the likelihood that the pivotal panel 42 will be held semiopen. Further because the pivotal panel 42 is not closed with the cartridge 6 loaded in position, it is possible to shorten the distance of up-down movement of the chassis 1 and also the horizontal distance from the pivotal panel 42 to the mechanical deck 100.

BRIEF DESCRIPTION OF THE DRAWINGS

FIG. 20(*b*) is a side elevation of the same as it is seen from the direction of arrow H in (a);

DETAILED DESCRIPTION OF THE PREFERRED EMBODIMENT

An embodiment of the invention will be described below with reference to the drawings concerned.

Figure 1:
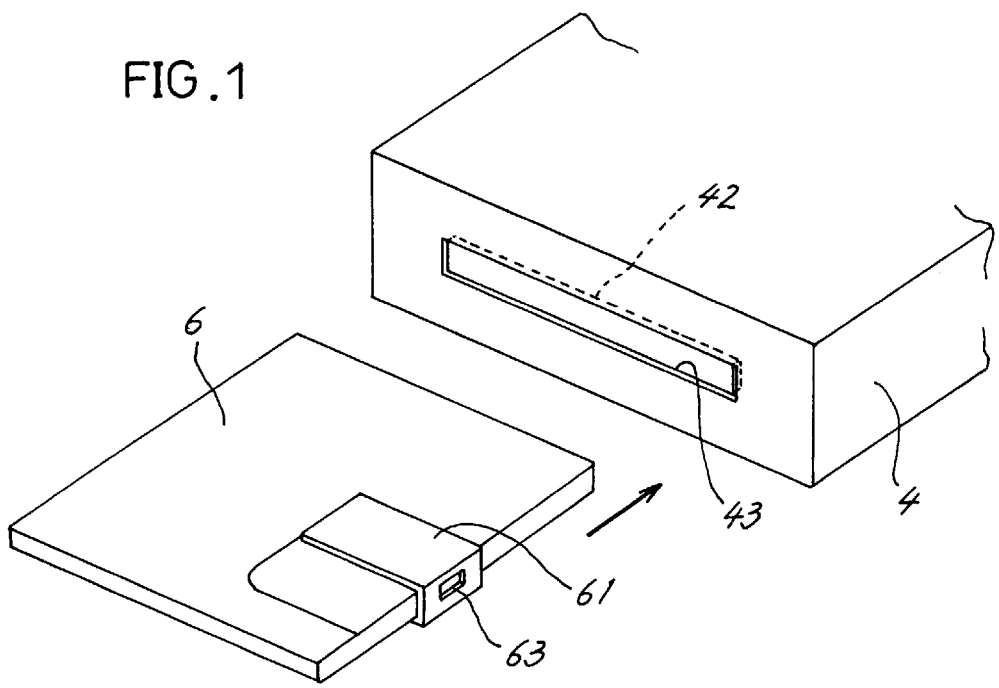
FIG. 1 is a perspective view of a cartridge and a cabinet.
Figure 2A:
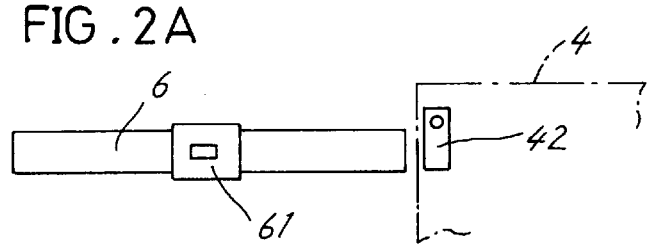
FIGS. 2(*a*) and (*b*) are side elevations showing the position of the cartridge and a pivotal panel relative to each other, (a) showing the same in a standby state, (b) showing the cartridge as loaded in place.

FIG. 1 is a perspective view of a cartridge 6 and a cabinet 4. The cartridge 6 is inserted into an inlet 43 of the cabinet 4, with a shutter 61 positioned at the right side. A pivotal panel 42 for closing the inlet 43 is pivoted at its upper end to the inside of a cabinet upper edge defining the inlet 43. FIGS. 2(*a*) and (*b*) are side elevations showing the position of the cartridge 6 and the pivotal panel 42 relative to each other. With the cartridge 6 inserted in the cabinet 4, the free end portion of the panel 42 is in bearing contact with the cartridge 6, whereby the panel 42 is held completely open as shown in FIG. 2(*b*). A label bearing the name of data recorded is often affixed to the rear end face of the cartridge 6, enabling the user to identify the recorded data, with the cartridge 6 inserted in the cabinet 4.

Detailed Description of Mechanical Deck

Figure 3:
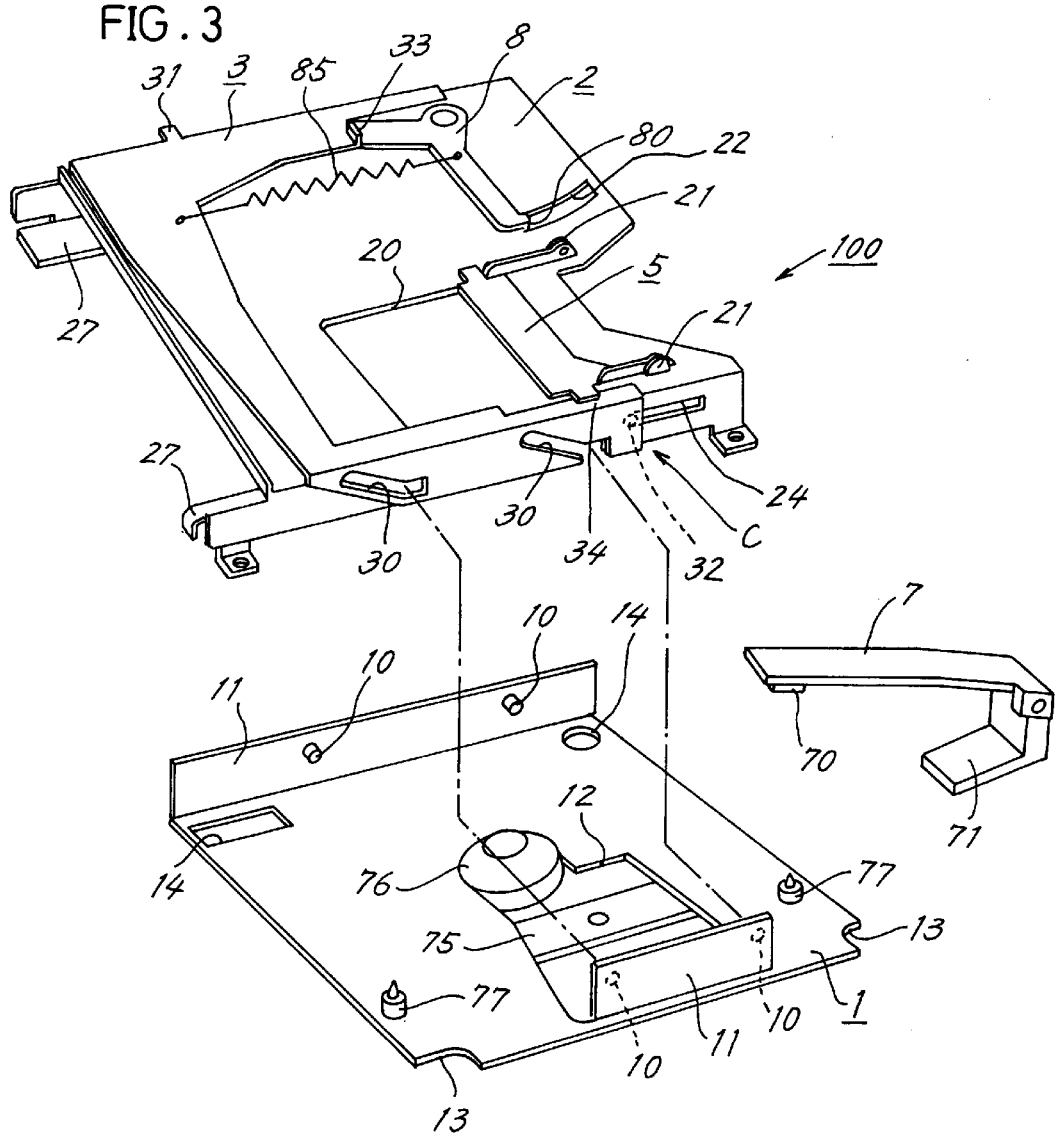
FIG. 3 is an exploded perspective view of a mechanical deck.

FIG. 3 is an exploded perspective view of a mechanical deck 100 positioned inside the cabinet 4. The deck 100 comprises an inner holder 2 for receiving the cartridge 6 as inserted therein, and an outer holder 3 provided over the inner holder 2 and slidable in the direction of insertion of the cartridge. The outer holder 3 and the inner holder 2 are positioned over the chassis 1. The chassis 1 has a pickup 75 and a turntable 76 and is further provided with pins 77, 77 for supporting the bottom of the cartridge 6.

With the device of the present embodiment, the inner holder 2 to be loaded with the cartridge 6 is fixed as attached to the cabinet 4 as will be described below, and the chassis 1 moves upward and downward relative to the inner holder 2.

The chassis 1 is provided at its opposite sides with support walls 11, 11 each having inward projections 10, 10. The projections 10, 10 fit in the inner holder 2 and the outer holder 3. An opening 12 for exposing the pickup 75 is formed in the chassis 1 and positioned rightward of its center. Cutouts 13, 13 and holes 14, 14 are formed in the respective corners of the chassis 1. As will be described later, the inner holder 2 is attached to the cabinet 4 through the cutouts 13, 13 and the holes 14, 14.

A head lever 7 is attached as biased downward to the pickup 75 by a bracket 71, and carries a recording head 70 at its distal end.

The outer holder 3 shown in FIG. 3 is formed by bending opposite side edges of a metal plate. Cam slots 30, 30 slanting downward along the direction of insertion of the cartridge are formed in each of side walls of the holder 3. The outer holder 3 has a projection 32 inwardly projecting from a front end portion thereof, and a grip 31 projecting outward from the left side wall thereof. The grip 31 is pulled toward the user for delivering the cartridge 6 from the deck.

A kickout lever 8 is pivotally supported at its base end on the upper surface of left end portion of the inner holder 2. The kick lever 8 has a free end bent downward to provide a push lug 80, which extends through a circular-arc slot 22 formed in the inner holder 2 to the inside thereof. As will be described later, the push lug 80 is pushed by the front end of the cartridge 6 when the cartridge 6 is inserted. A tension spring 85 extends from the outer holder 3 to the kickout lever 8, pressing the lever 8 into contact with a stopper 33 provided on the outer holder 3 in a standby state wherein no cartridge 6 is inserted in tne inner holder 2.

Head Lever Drive Mechanism

Figure 4:
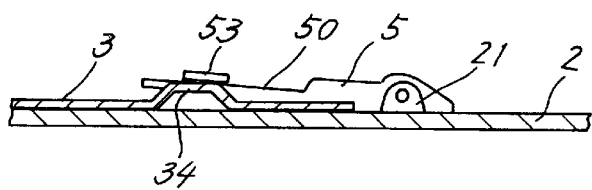
FIG. 4 is a side elevation partly broken away and showing the deck as it is seen from the direction of arrow C in FIG. 3.

The inner holder 2 has an aperture 20 for permitting the recording head 70 to pass therethrough, and is formed on its upper surface with lugs 21, 21 positioned to the front of the aperture 20. FIG. 4 is a side elevation of the deck 100 as it is seen from the direction of arrow C in FIG. 3, and FIG. 5 is a perspective view of a head drive lever 5.

Figure 5:
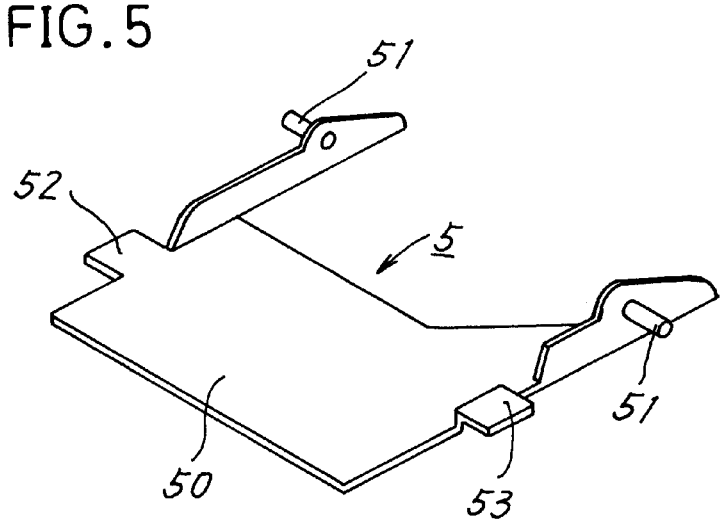
FIG. 5 is a perspective view of a head drive lever.

With reference to FIG. 5, the head drive lever 5 comprises a contact plate 50 having pivots 51, 51 projecting outward from the base ends of opposite side portions thereof and supported by the respective lugs 21, 21. The contact plate 50 has a first contact piece 52 projecting from one of the plate side portions and in contact with the upper surface of the inner holder 2, and a second contact piece 53 projecting from the other side portion, raised from the plate 50 and in contact with the outer holder 3.

As shown in FIG. 4, the outer holder 3 is formed with a protrusion 34 so located as to come into contact with the second contact piece 53. When the second contact piece 53 is brought into contact with the protrusion 34 with the sliding movement of the outer holder 3, the head drive lever 5 is pushed up to pivotally move upward. The head lever 7 is biased downward about the pivot of the head lever 7 on the bracket 71 as previously stated, and the free end of the head lever 7 contacts the contact plate 50 of the head drive lever 5. When the deck 100 is in its standby position, the head drive lever 5 is in a raised position, permitting advance of the cartridge 6 as seen in FIG. 13(b).

Arrangement of Inner and Outer Holders and Chassis

Figure 6:
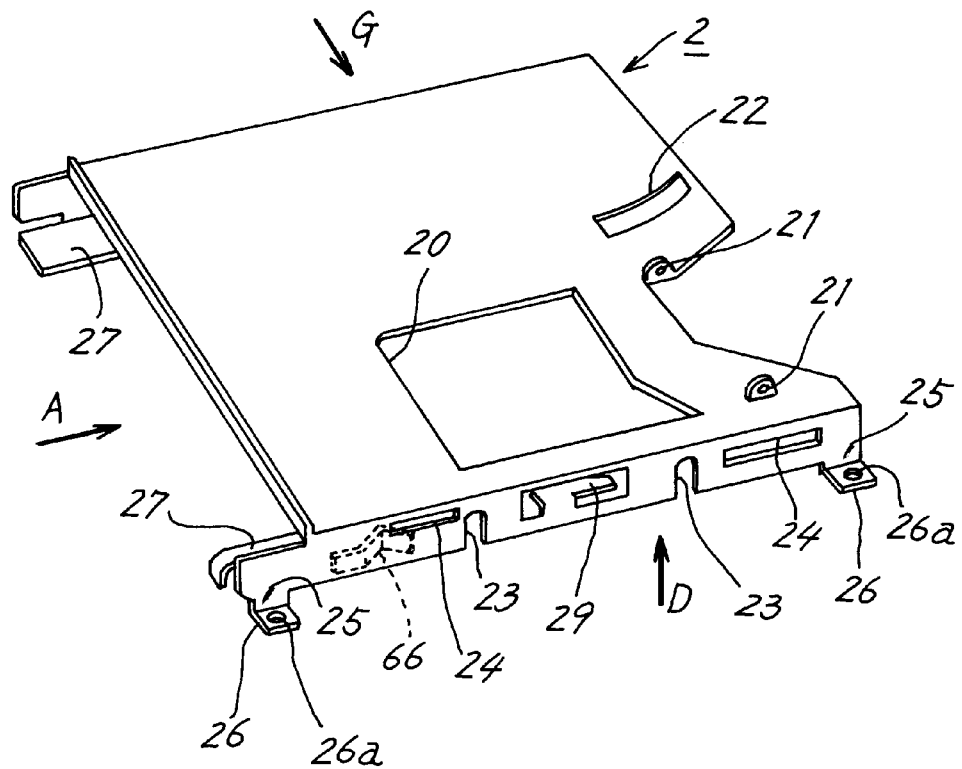
FIG. 6 is a perspective view of an inner holder.
Figure 7:
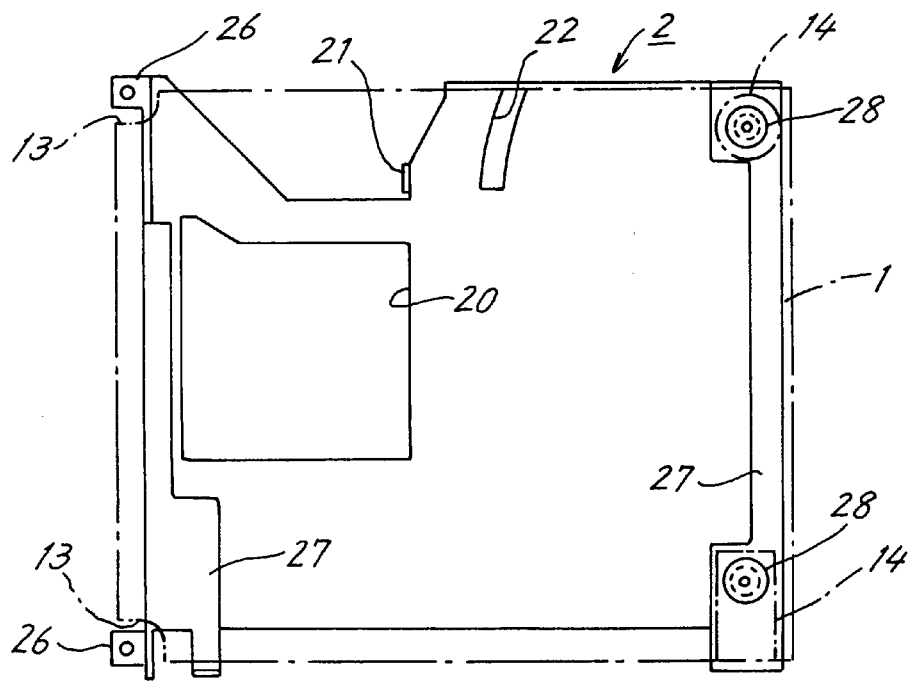
FIG. 7 is a bottom view of the inner holder of FIG. 6.
Figure 8:
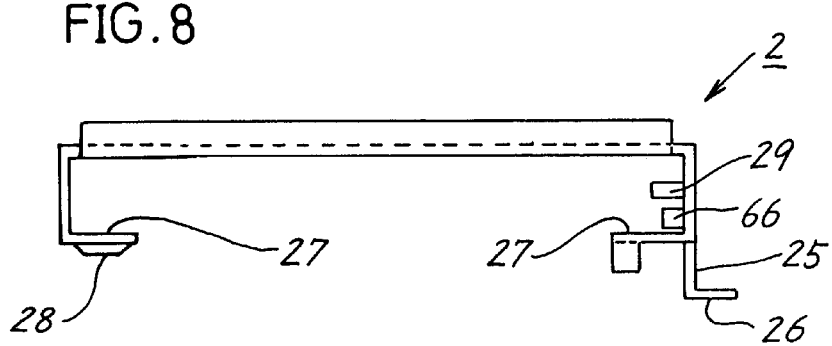
FIG. 8 is a front view of the inner holder as it is seen from the direction of arrow A in FIG. 6.
Figure 9:
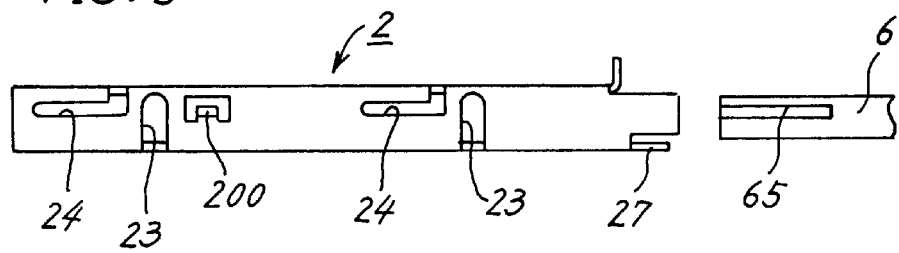
FIG. 9 is a left side elevation of the inner holder as it is seen from the direction of arrow G in FIG. 6.

FIG. 6 is a perspective view of the inner holder 2, FIG. 7 is a bottom view of the same as it is seen from below upward, FIG. 8 is a front view of the same as it is seen from the direction of arrow A in FIG. 6, and FIG. 9 is a left side elevation of the same as it is seen from the direction of arrow G in FIG. 6. The chassis 1 indicated in a chain line in FIG. 7.

As shown in FIG. 6, each of the side walls of the inner holder 2 has vertical slots 23, 23 opposed to the cam slots 30, 30 of the outer holder 3, and horizontal slots 24 having fitted therein the projections 32 of the outer holder 3 for guiding the horizontal sliding movement of the outer holder 3. When the inner holder 2 is loaded with the cartridge 6 and also when it is vacant, the aperture 20 of the inner holder 2 is not covered with the outer holder 3. Legs 25, 25 extend downward respectively from the front and rear ends of side wall of the inner holder 2 and have lower ends bent outward to provide mount portions 26. A threaded bore 26a is formed in each mount portion 26 centrally thereof.

As shown in FIGS. 7 and 8, the opposite side walls of the inner holder 2 are bent inward at their lower ends to provide support plates 27, 27 for supporting the cartridge 6 at its bottom. One of the support plates 27 has protuberances 28, 28 protruding toward the chassis 1. The protuberances 28, 28 are in register with the respective holes 14, 14 of the chassis 1.

With reference to FIGS. 6 and 8, the midportion of one side wall of the inner holder 2 is inwardly bent to provide an unlocking piece 29 which is movable into the first slit 64 of the cartridge 6. A spring 66 having a crest facing inward is provided inside the inner holder 2 to the rear of the unlocking piece 29.

Figure 20A:
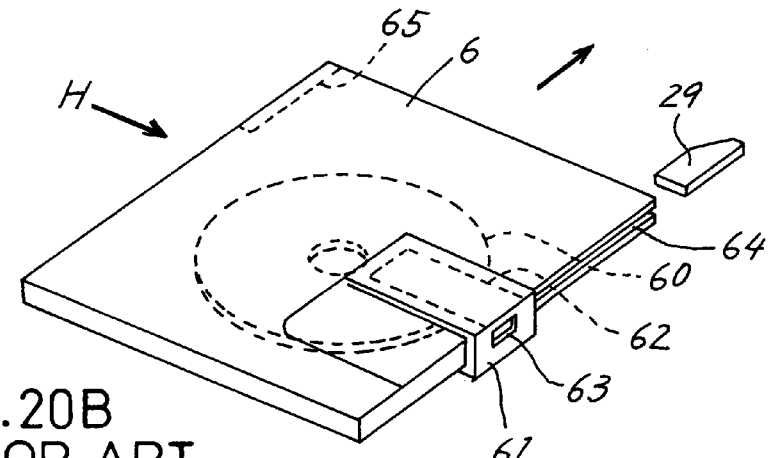
FIG. 20(*a*) is a perspective view of a cartridge.
Figure 20B:
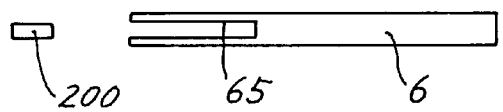
Figure 21:
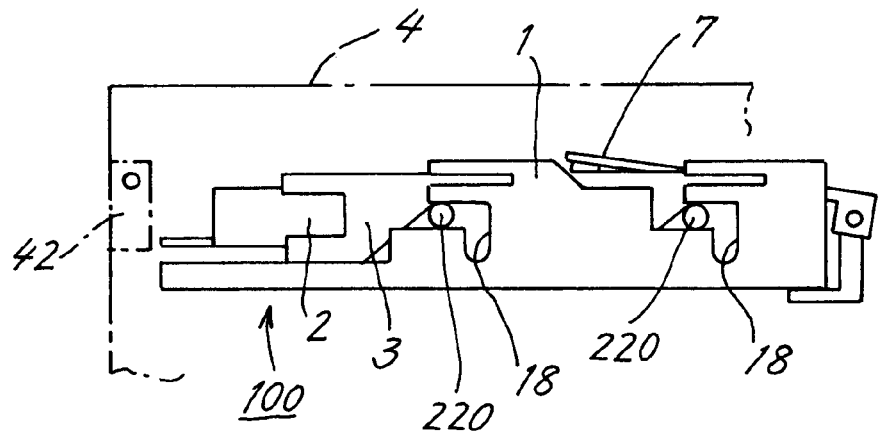
FIG. 21 is a side elevation showing the mechanical deck and a cabinet relative to each other.
Figure 22A:
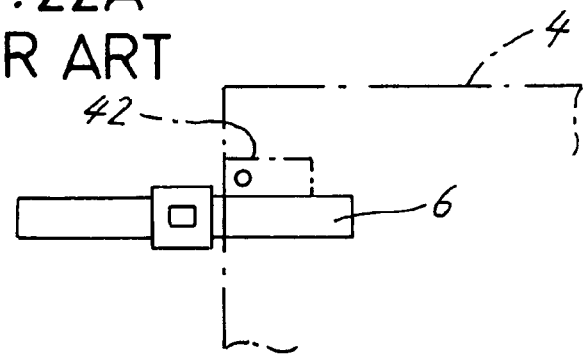
FIGS. 22(*a*) and (*b*) are side elevations of the cartridge and the cabinet, (a) showing the cartridge being inserted into the cabinet; (b) showing the cartridge as inserted.
Figure 22B:
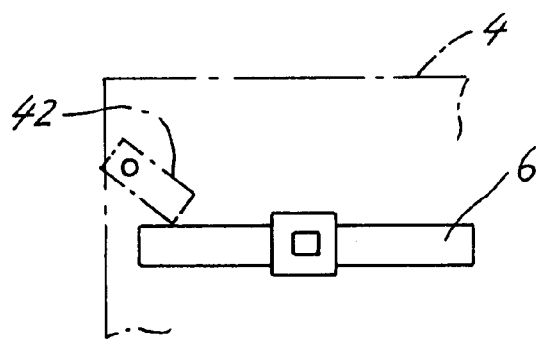

As the cartridge 6 is inserted into the inner holder 2, the unlocking piece 29 shown in FIG. 20(a) advances into the first slit 64, unlocking the shutter 61 and pushing the shutter 61 open. When the cartridge 6 is pulled out of the holder 2, the spring 66 fits into the small hole 63 in the shutter 61, closing the shutter as the cartridge 6 is moved toward the delivery direction. When the cartridge 6 is further pulled out as it is, the shutter 61 is released from the fitting engagement with the spring 66.

Inwardly projecting from the front end of the left side wall of the inner holder 2 shown in FIG. 9 is an engaging piece 200 fittable in the second slit 65 of the cartridge 6.

Figure 10:
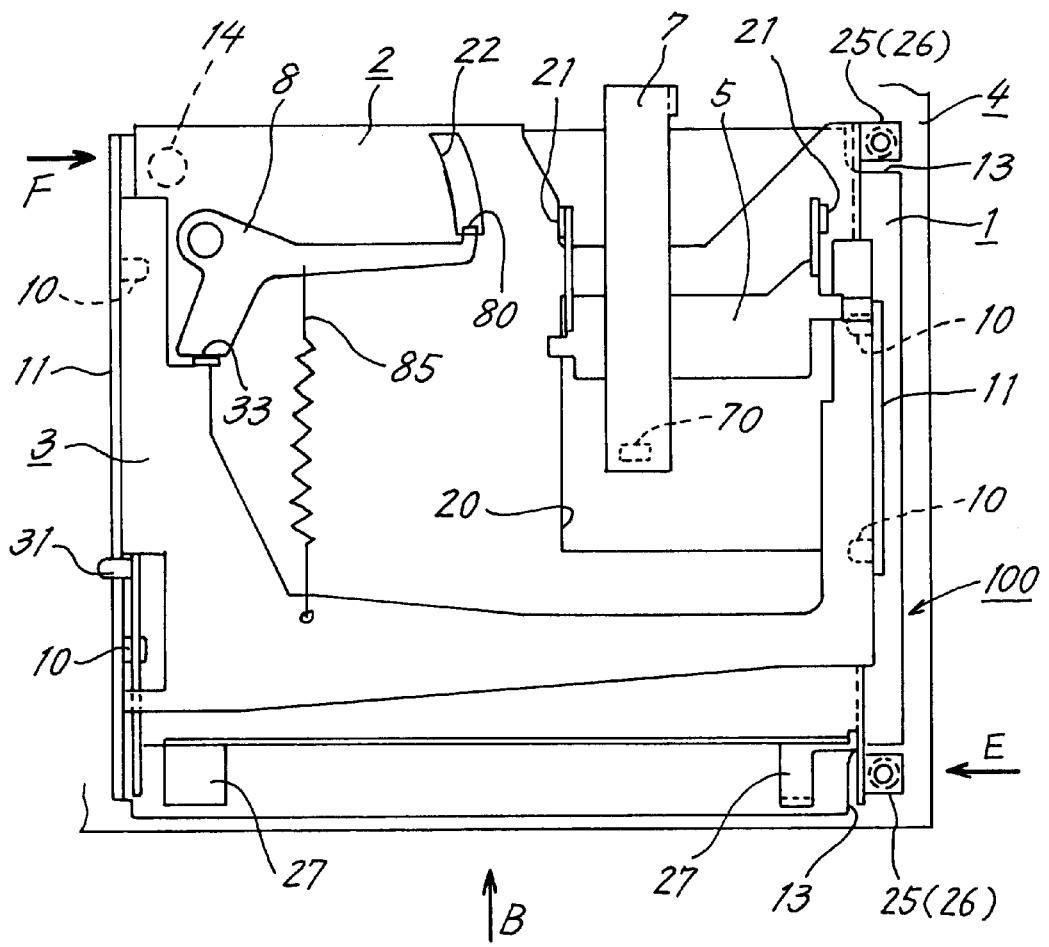
FIG. 10 is a plan view of the mechanical deck in a standby position.
Figure 11:
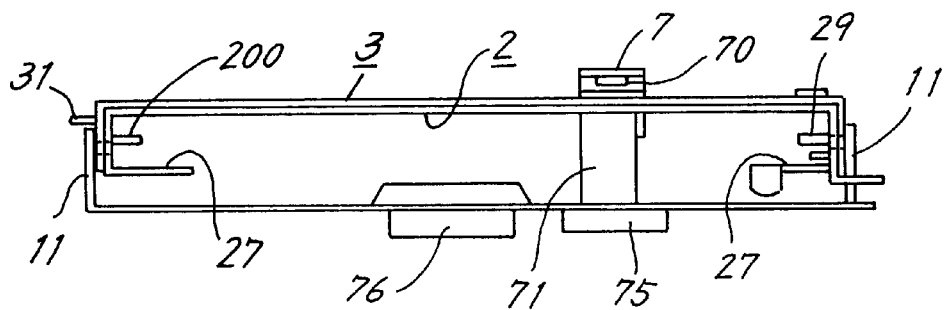
FIG. 11 is a front view of the deck as it is seen from the direction of arrow B in FIG. 10.

FIG. 10 is a plan view of the mechanical deck 100 as attached in its standby position to the cabinet 4, and FIG. 11 is a front view showing the deck 100 as it is seen from the direction of arrow B in FIG. 10. The kickout lever 8 is biased rearward by the tension spring 85, with the push lug 80 in contact with the rear edge of the circular-arc slotted portion 22 of the inner holder 2. The stopper 33 of the outer holder 3 is in contact with the kickout lever 8, which restrains the outer holder 3 from advancing.

Figure 13A:
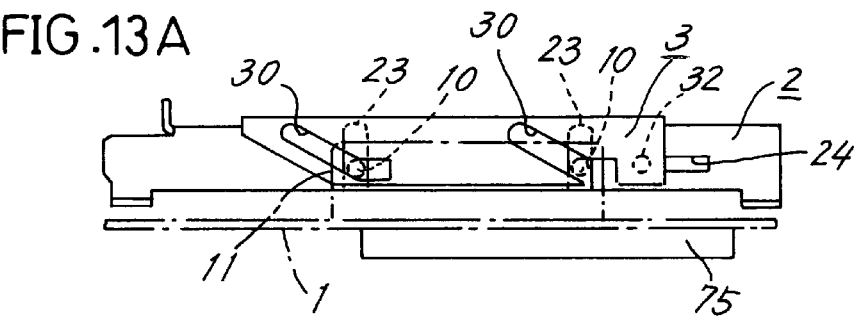
FIGS. 13(*a*) and (*b*) are side elevations of the mechanical deck in the standby position, (a) showing the position of the inner holder and an outer holder relative to each other, (b) showing the position of the head drive lever and a head lever relative to each other.
Figure 13B:
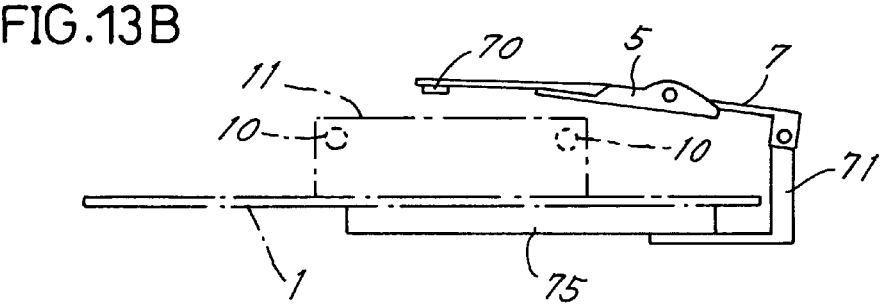

Further as shown in FIG. 13(a), the projections 10 of the chassis 1 are positioned at the lower ends of the respective cam slots 30 of the outer holder 3 and are in the lowermost position remotes from the inner holder 2. The head drive lever 5 is in its raised position as stated above, holding the head lever 7 lifted as seen in FIG. 13(b).

Chassis Provided in Cabinet

Figure 15:
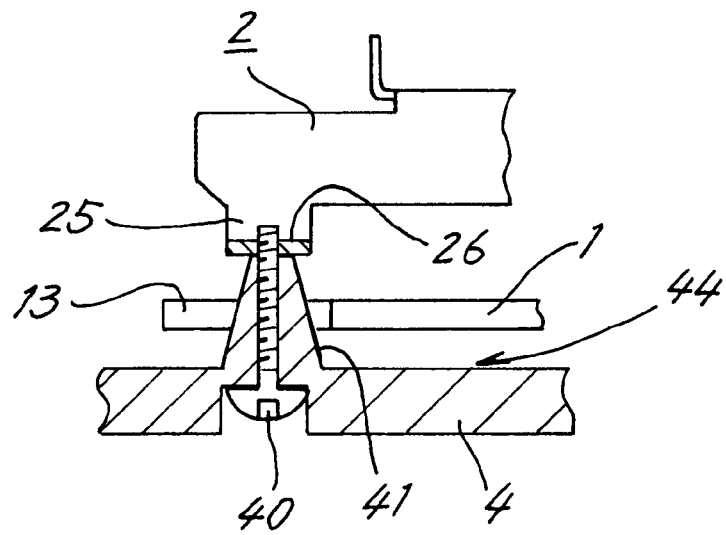
FIG. 15 is a right side elevation partly broken away and showing the cabinet as it is seen from the direction of arrow E in FIG. 10.
Figure 16:
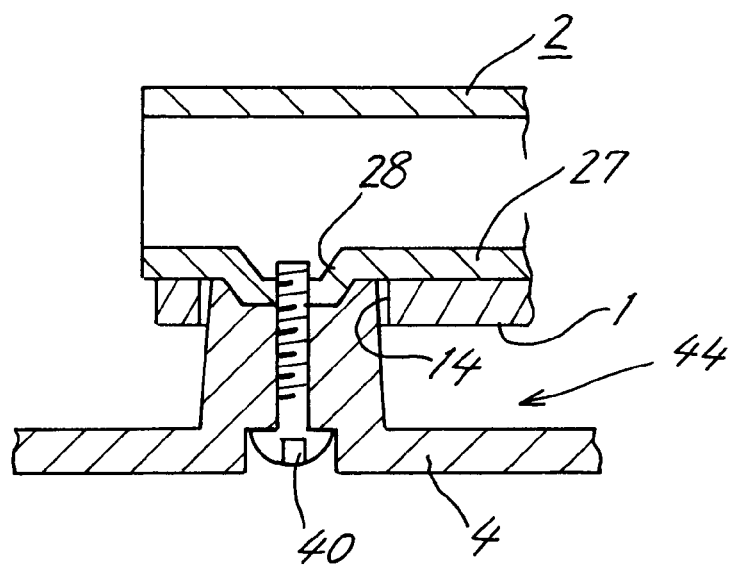
FIG. 16 is a left side elevation of part of the cabinet as it is seen from the direction of arrow F in FIG. 10.
Figure 17:
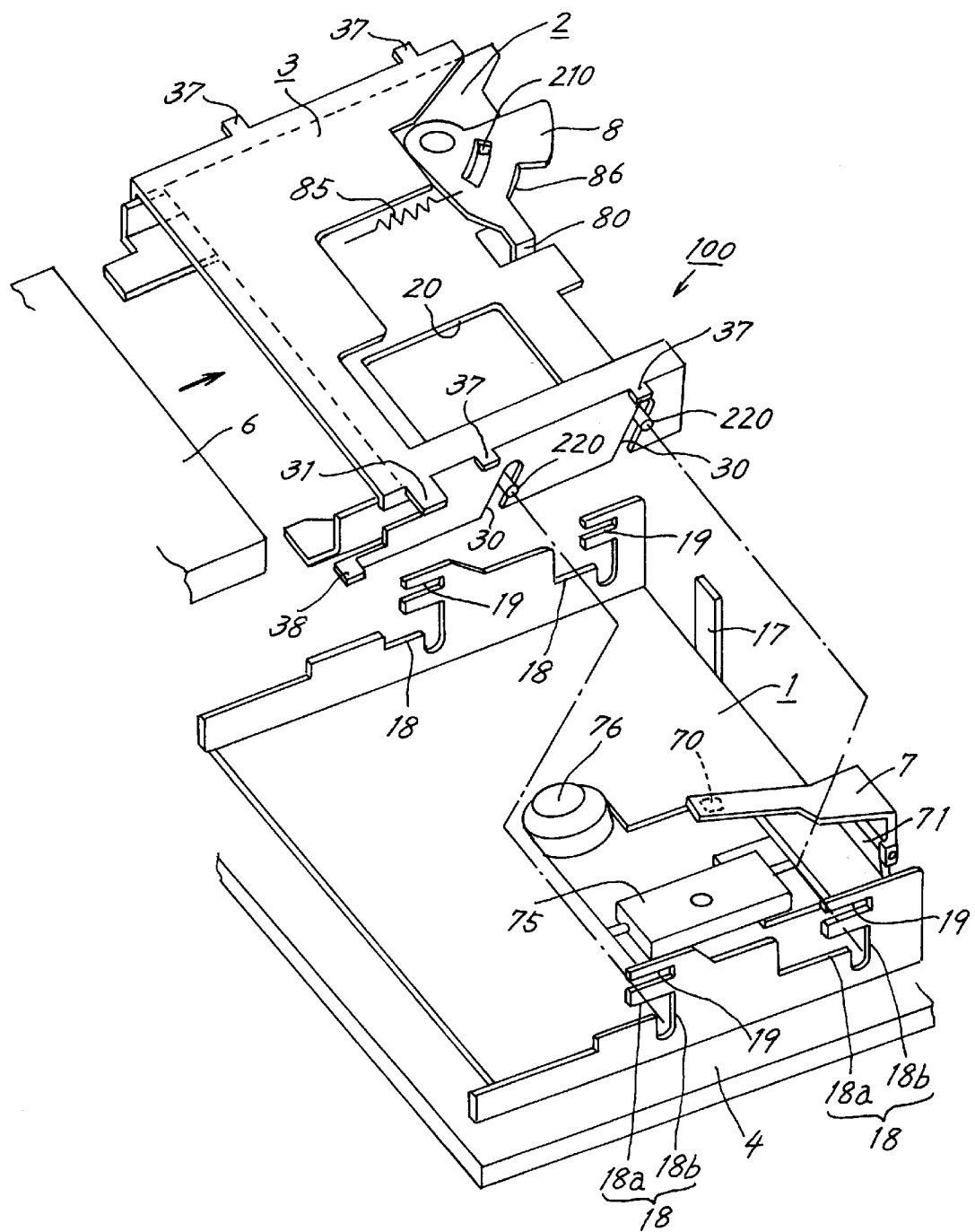
FIG. 17 is an exploded perspective view of a conventional disk recording-playback device.
Figure 18A:
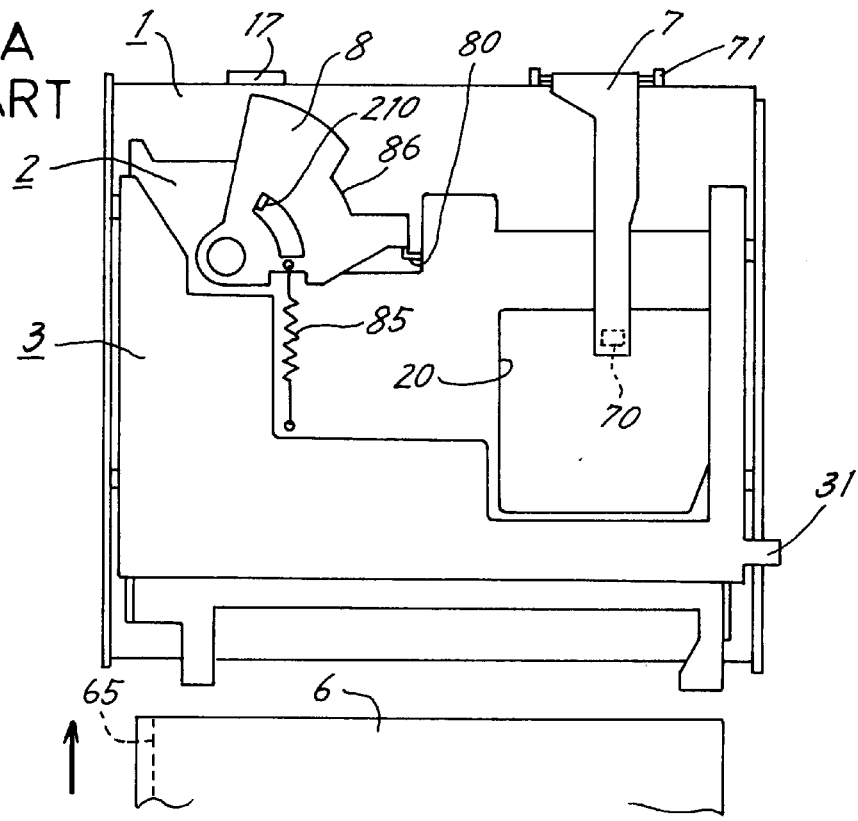
FIGS. 18(*a*) and (*b*) are plan views of a conventional mechanical deck, (a) showing the same in a standby position, (b) showing the same as loaded.
Figure 18B:
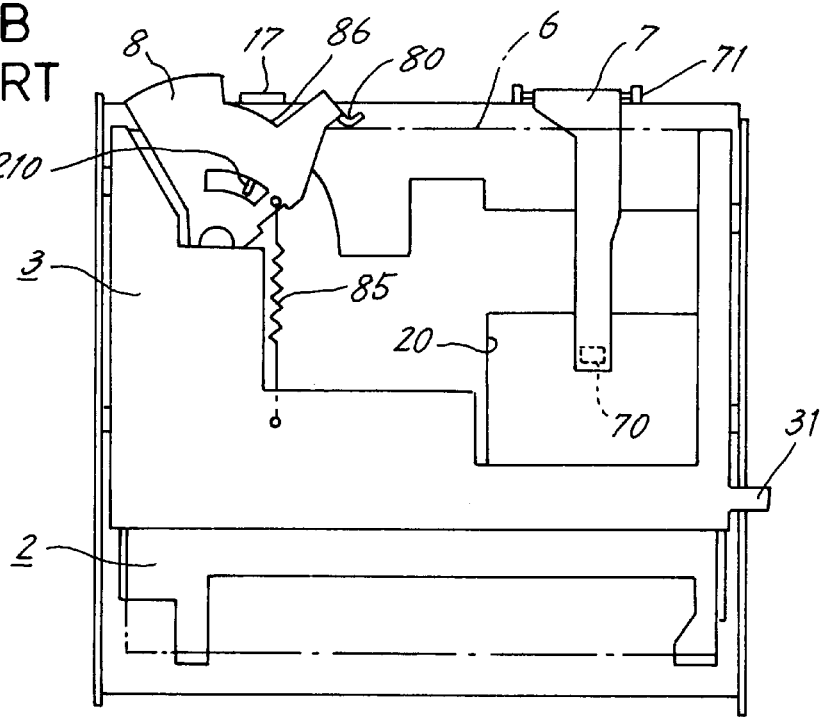
Figure 19A:
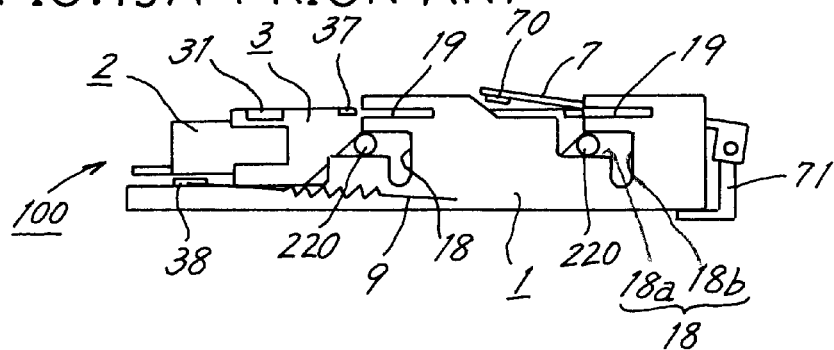
FIGS. 19(*a*) and (*b*) are side elevations of the conventional mechanical deck, (a) showing the same in the standby position, (b) showing the same as loaded.
Figure 19B:
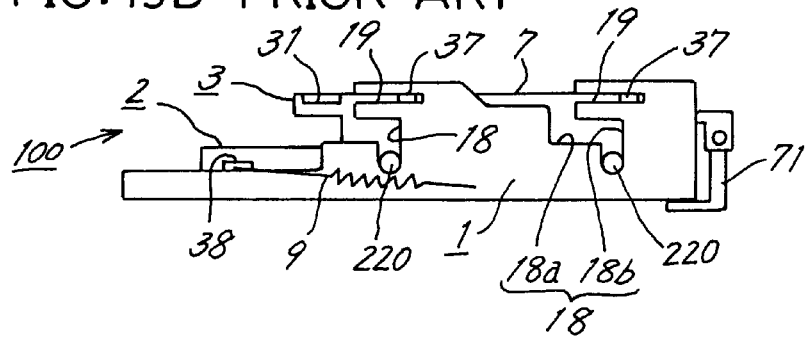

FIG. 15 is a side elevation in section showing the cabinet as it is seen from the direction of arrow E in the plan view of FIG. 10, and FIG. 16 is a side elevation in section of the same as it is seen from the direction of arrow F in FIG. 10. As shown in FIG. 15, the cabinet 4 has a boss 41 projecting therefrom and extending through the cutout 13 of the chassis 1 from therebelow upward. The inner holder 2 is supported by the boss 41. A screw 40 extends through the boss 41 from the underside of the cabinet 4 and is screwed into the mount plate 26 to fasten the inner holder 2 to the cabinet 4.

Further as seen in FIG. 16, the protuberance 28 of the inner holder 2 is in register with the hole 14 in the chassis 1, and fastened to the cabinet 4 with a screw 40 extending upward from the underside of the cabinet 4.

With the device of the present embodiment, the inner holder 2 is fixed to the cabinet 4, and the chassis 1 is movable upward and downward. Data is recorded on the disk, with the chassis 1 in a completely raised position.

Insertion of Cartridge

When the cartridge 6 is placed onto the support plates 27 of the inner holder 2 and pushed into the holder 2, with the mechanical deck 100 in its standby position shown in FIG. 10, the front end of the cartridge 6 pushes the push lug 80 of the kickout lever 8, rotating the lever 8 counterclockwise. The cartridge 6 slides along with the engaging piece 200 of the inner holder 2 fitting in the second slit 65 of the cartridge 6 (see FIG. 9).

Figure 12A:
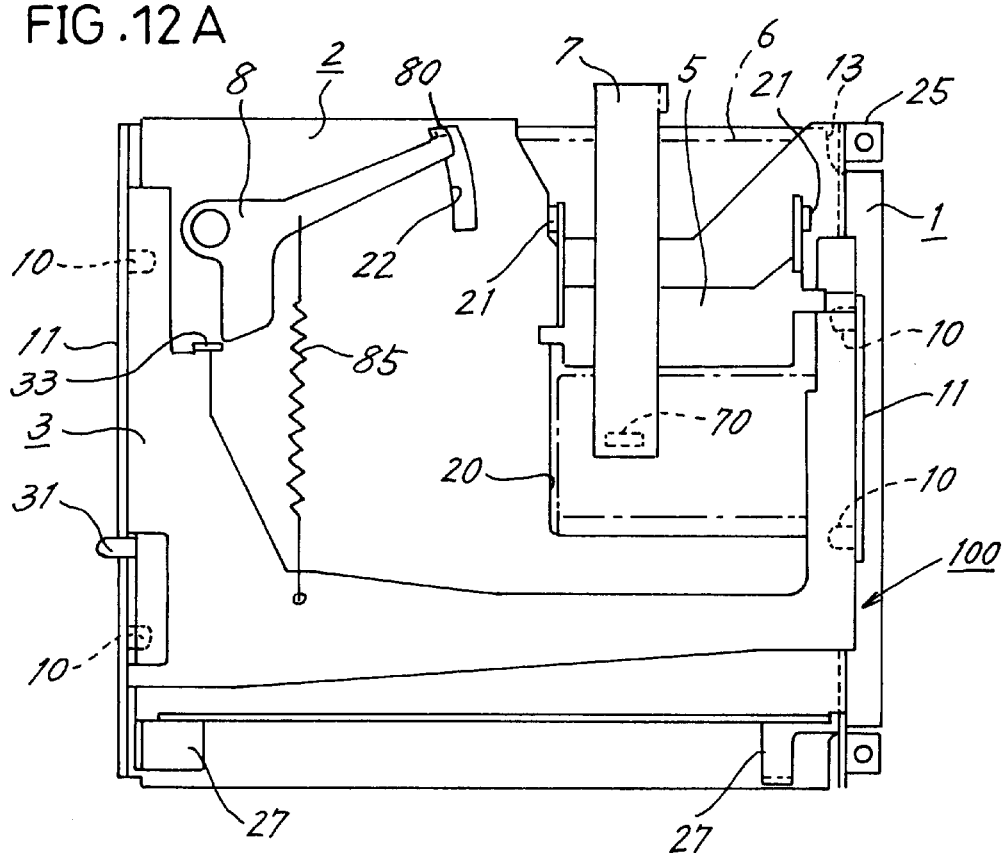
FIGS. 12(*a*) and (*b*) are plan views showing the cartridge as inserted in the deck.
Figure 12B:
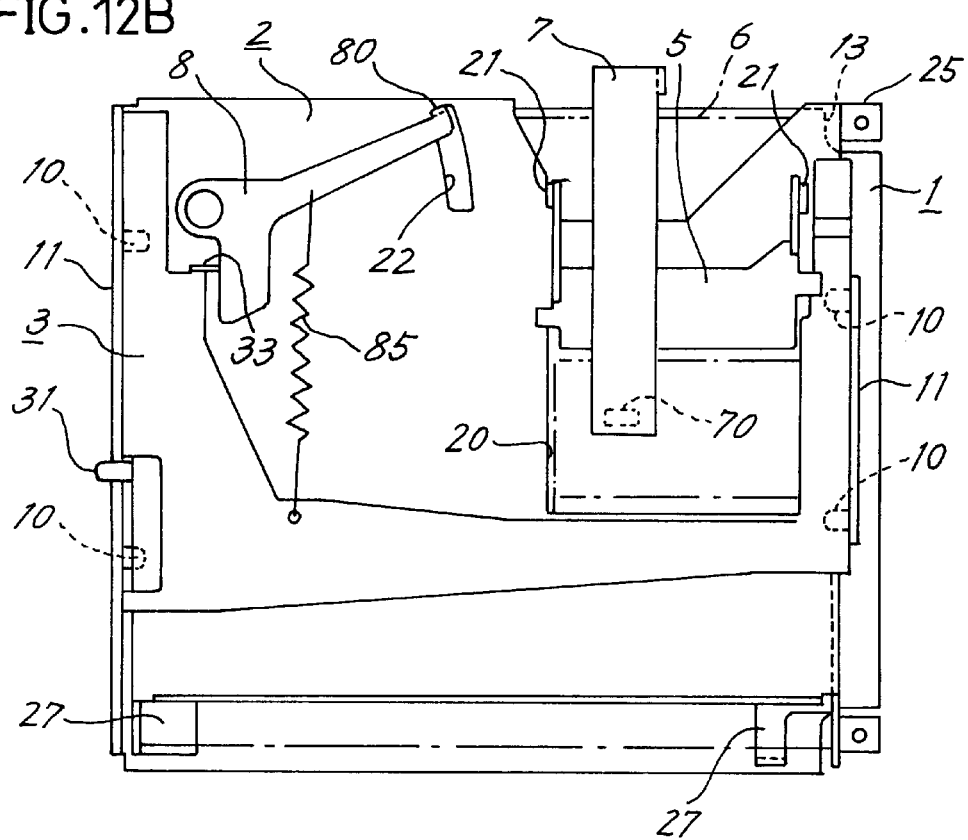

FIGS. 12(a) and (b) are plan views showing parts during the insertion of the cartridge 6 to its loaded position. With the cartridge 6 completely pushed in as seen in FIG. 12(a), the rotation of the kickout lever 8 releases the stopper 33 therefrom, causing the outer holder 3 to be advanced by the tension spring 85 as shown in FIG. 12(b). In this state, the shutter 61 on the cartridge 6 has already been opened by the unlocking piece 29, exposing the disk from the cartridge 6.

Data Recording and Reproduction

Figure 14A:
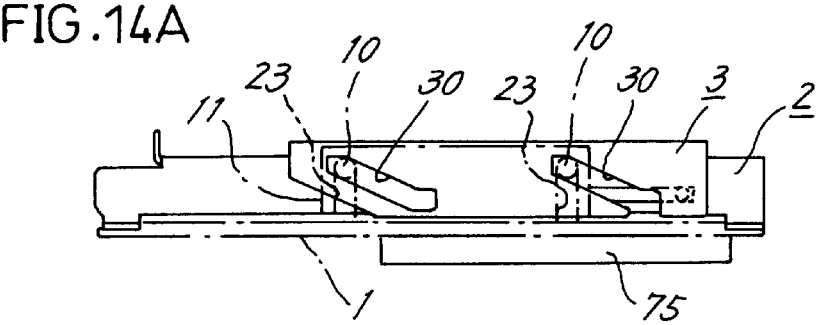
FIGS. 14(*a*) and (*b*) are side elevations of the mechanical deck with the cartridge loaded in place, (a) showing the position of the inner holder and the outer holder relative to each other, (b) showing the position of the head drive lever and the head lever relative to each other.
Figure 14B:
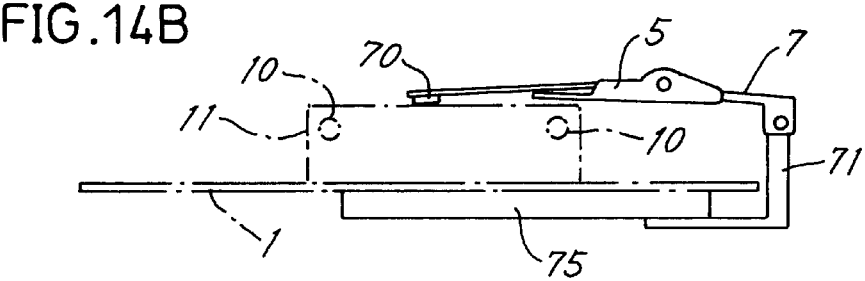

The advance of the outer holder 3 releases the second contact piece 53 of the head drive lever 5 from the protrusion 34 of the outer holder 3, allowing the lever 5 to move down as shown in FIG. 14(b) and the downwardly biased head lever 7 also to pivotally move downward to bring the recording head 70 closer to the disk through the aperture 20.

Further as seen in FIG. 14(a), the chassis 1 having its projections 10 fitted in the respective cam slots 30 is biased upward and raised vertically upward along the vertical slots 23 of the inner holder 2 by the advance of the outer holder 3. The cartridge 6 has a thickness of about 5 mm. The upward stroke length of the chassis 1 is set to a distance smaller than the thickness of the cartridge 6 by the present applicant. The chassis 1 stops upon the projections 10 reaching the upper ends of the cam slots 30. The turntable 76 fits to the disk inside the cartridge 6, making it possible to record data on the disk.

The outer holder 3 is biased forward by the tension spring 85 and therefore forces the projections 10 to press the turntable 76 on the chassis 1 against the cartridge 6, whereby the disk 60 in the cartridge 6 is prevented from backlashing relative to the turntable 76.

Figure 2B:
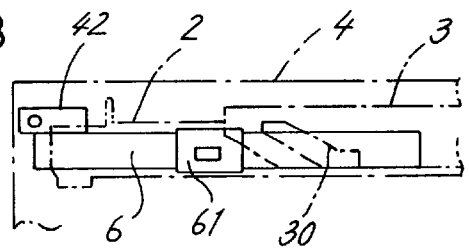

When the cartridge 6 is in its loaded position, the pivotal panel 42 shown in FIG. 2(b) is left open with its rear end portion bearing on the upper surface of rear end portion of the cartridge 6 as previously stated. This enables the user to recognize the data name on the rear end face of the cartridge 6.

When the cartridge 6 is inserted into the device, the recording head 70 descends. The disk can be played back when no current is passed through the recording head 70.

Delivery of Cartridge

To deliver the cartridge 6 from the loaded position shown in FIG. 12(b), the grip 31 of the outer holder 3 is pulled out by hand against the tension spring 85. The protrusion 34 of the outer holder 3 comes into contact with the second contact piece 53 of the head drive lever 5 to raise the head lever 7 as seen in FIG. 13(b).

From the state shown in FIG. 14(a), the projections 10 of the chassis 1 fitting in the respective cam slots 30 are urged downward, moving the chassis 1 downward along the vertical slots 23 and moving the turntable 76 away from the cartridge 6.

When the outer holder 3 is further pulled out, the stopper 33 moves out of the path of pivotal movement of the kickout lever 8 as shown in FIG. 12(a), permitting the tension spring 85 to rotate the lever 8 clockwise. The push lug 80 of the lever 8 delivers the cartridge 6 from the inner holder 2 under the action of the tension spring 85.

Since the inner holder 2 is attached through the chassis 1 to the cabinet 4, there is no need to give a large upper surface to the inner holder 2.

Furthermore, loading of the cartridge 6 into the inner holder 2 automatically brings the head lever 7 close to the cartridge 6, whereby the head 70 is made ready to record data on the disk. Accordingly, there is no need to additionally provide a mechanism for moving the head lever 7 upward and downward. This results in a reduction in the number of components.

Further with the mechanical deck 100 of the present device, the tension spring 85 biases the turntable 76 toward the cartridge 6 for recording and pushes the cartridge 6 for delivery from the deck. Thus, the single tension spring 85 acts to deliver the cartridge 6 from the device and to hold the cartridge 6 in the recording position. This serves to reduce the number of components.

Although portions of the cabinet 4 are inserted through the holes 14 or cutouts 13 according to the present embodiment, the legs 25 of the inner holder 2 may alternatively extend through the holes 14 or cutouts 13.

What is claimed is:

1. A disk recording device wherein a mechanical deck is provided inside a cabinet, the mechanical deck comprising an inner holder for horizontally holding therein a cartridge containing a disk, a chassis movable toward and away from the inner holder and provided with a pickup movable toward the disk, and an outer holder provided over the inner holder and slidable along the direction of insertion of the cartridge, the cartridge being insertable into the cabinet through a front opening thereof, the disk recording device being characterized in that:

the outer holder is formed with cam slots for moving the inner holder and the chassis toward and away from each other with the sliding movement of the outer holder, the inner holder being fixed to the cabinet through holes and cutouts formed in the chassis, the chassis being movable upward and downward relative to the inner holder along the cam grooves, and a space for accommodating the pickup being formed between a lower surface of the chassis and a bottom surface of the cabinet when the chassis is in a completely lowered position.

2. A disk recording device according to claim 1 wherein a pivotal panel pushable inward by the cartridge is pivoted at an upper end thereof to an opening-defining front portion of the cabinet, and held completely open by the contact of a lower end of the panel with an upper surface of the cartridge, with a rear end face of the cartridge exposed from the front opening of the cabinet, when the cartridge is loaded in position.

* * * * *